US006765908B1

(12) United States Patent
Chen

(10) Patent No.: US 6,765,908 B1
(45) Date of Patent: Jul. 20, 2004

(54) SYSTEM AND METHOD FOR TRANSFERRING PACKETS IN A "CONNECTIONLESS" NETWORK

(75) Inventor: Frank S. Chen, Andover, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/670,089

(22) Filed: Jun. 25, 1996

(51) Int. Cl.[7] .............................................. H04L 12/56
(52) U.S. Cl. ..................... 370/392; 370/401; 370/409
(58) Field of Search .................................. 370/389, 392, 370/395, 396, 397, 400, 409, 474, 475, 352, 353, 354, 355, 356, 395.1, 395.3, 395.31, 395.52, 395.53, 401, 465, 466

(56) References Cited

U.S. PATENT DOCUMENTS

| | | | | |
|---|---|---|---|---|
| 5,163,045 A | * | 11/1992 | Caram et al. | 370/409 |
| 5,303,236 A | * | 4/1994 | Kunimoto et al. | 370/395 |
| 5,357,508 A | * | 10/1994 | Le Boudec et al. | 370/397 |
| 5,420,858 A | * | 5/1995 | Marshall et al. | 370/395 |
| 5,440,552 A | * | 8/1995 | Sugita | 370/395 |
| 5,473,603 A | * | 12/1995 | Iwata | 370/426 |
| 5,612,959 A | * | 3/1997 | Takase et al. | 370/390 |
| 5,649,108 A | * | 7/1997 | Spiegel et al. | 370/400 |
| 5,854,899 A | * | 12/1998 | Callon et al. | 370/235 |
| 5,930,255 A | * | 7/1999 | Tsukamoto et al. | 370/397 |
| 6,091,725 A | * | 7/2000 | Cheriton et al. | 370/392 |
| 6,181,679 B1 | * | 1/2001 | Ashton et al. | 370/244 |

* cited by examiner

Primary Examiner—Chau Nguyen
Assistant Examiner—Soon-Dong Hyun

(57) ABSTRACT

A network comprises a plurality of devices interconnected by a plurality of switching nodes. At least one device, as a source device, generates device packets for transfer to other devices, as destination devices, with each device packet including an address portion including an address identifying at least one of the destination devices. The switching nodes establish respective virtual circuits thereover for transferring virtual circuit packets from at least one the switching node, as an originating switching node, which is connected to the source device, to others of the switching nodes, as respective terminating switching nodes, each of which is connected to a destination device. The originating switching node receives each device packet from the source device and generates a respective virtual circuit packet therefor, each virtual circuit packet including a virtual circuit identifier identify one of the virtual circuits over which the virtual circuit packet is to be transferred, and transferring the respective virtual circuit packet over the virtual circuit. Successive switching nodes associated with each virtual circuit, as intermediate switching nodes, receive the virtual circuit packets and use the virtual circuit identifier in each packet to determine routing for the virtual circuit packet. Each terminating switching node, upon receipt of a the virtual circuit packet, extract the device packet and, using the address identifying the destination device, transfer the device packet to the identified destination device.

11 Claims, 13 Drawing Sheets

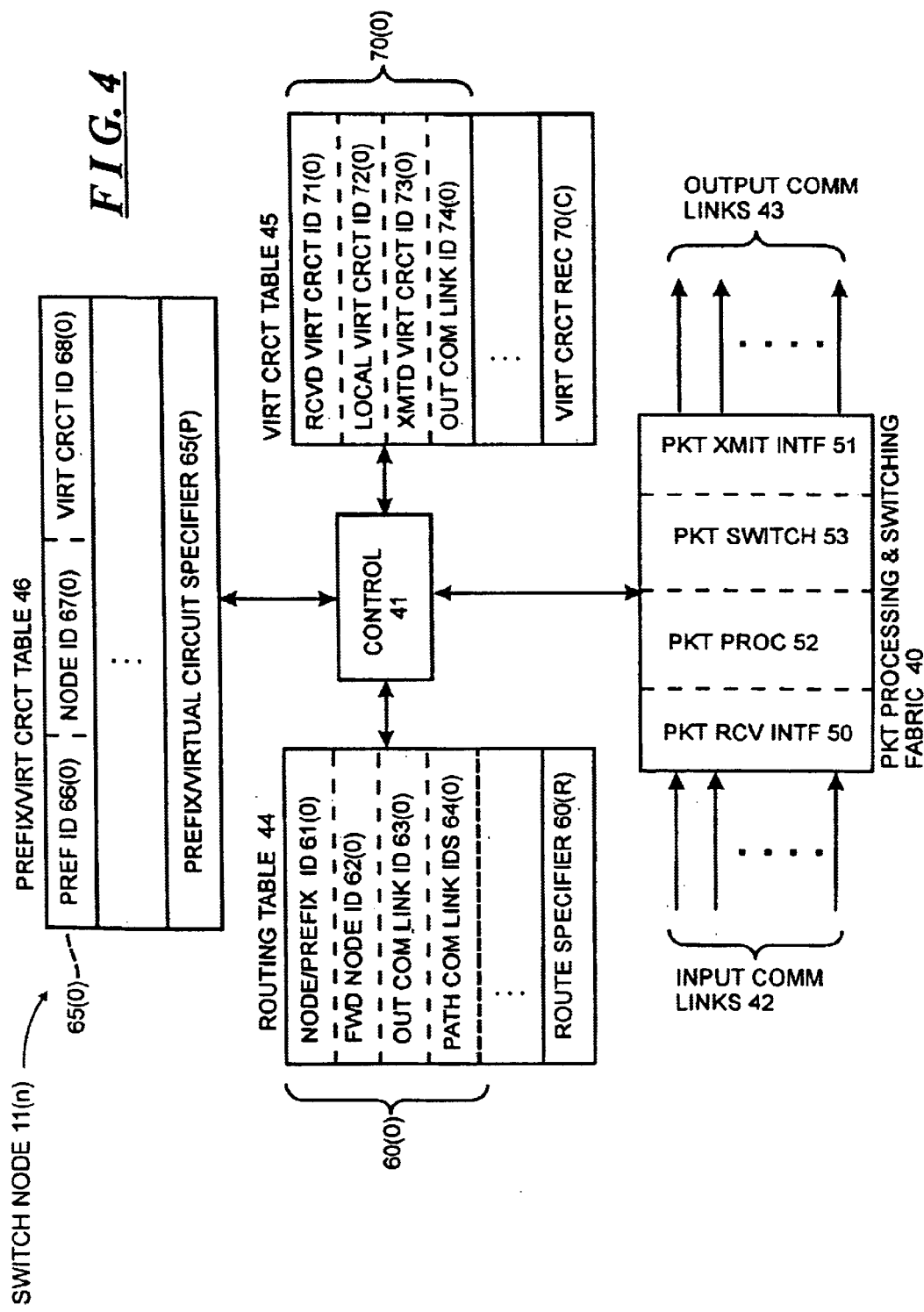

FIG. 5E

↓

123. CONTROL SUBSYSTEM 41 OBTAINS THE IDENTIFIER FOR THE ONE OF THE OUTPUT COMMUNICATION LINKS 43 ASSOCIATED WITH THE VIRTUAL CIRCUIT FROM FIELD 74 OF THE VIRTUAL CIRCUIT DATABASE

↓

124. CONTROL SUBSYSTEM 41 PROVIDES BOTH THE VIRTUAL CIRCUIT IDENTIFIER AND THE OUTPUT COMMUNICATION LINK IDENTIFIER TO THE PACKET PROCESSING SECTION 52

↓

125. PACKET PROCESSING SECTION 52 GENERATES VIRTUAL CIRCUIT PACKET 30, EMBED DEVICE PACKET 20 IN THE GENERATED VIRTUAL CIRCUIT PACKET 30, AND LOADS VIRTUAL CIRCUIT IDENTIFIER IN FIELD 32 OF THE GENERATED DEVICE PACKET 30

↓

126. PACKET PROCESSING SECTION 52 USES THE OUTPUT COMMUNICATION LINK IDENTIFIER OBTAINED FROM THE CONTROL SUBSYSTEM 41 TO CONTROL THE PACKET SWITCHING SECTION 53, TO, IN TURN, ENABLE THE VIRTUAL CIRCUIT PACKET TO BE TRANSMITTED OVER THE OUTPUT COMMUNICATION LINK 43 IDENTIFIED BY THE OUTPUT COMMUNICATION LINK IDENTIFIER

SYSTEM AND METHOD FOR TRANSFERRING PACKETS IN A "CONNECTIONLESS" NETWORK

FIELD OF THE INVENTION

The invention relates generally to the field of digital networking systems, and more particular to systems and methods for controlling the transfer of message packets over a digital network. The invention particularly provides an system and method by which message packets which are provided for transfer using a "connectionless" packet transfer methodology can be transferred over a network using a virtual circuit packet transfer methodology.

BACKGROUND OF THE INVENTION

Digital networks have been developed to facilitate the transfer of information, including data and programs, among digital computer systems and numerous other types of devices. A variety of types of networks have been developed and implemented using diverse information transfer methodologies. In modem networks, information is transferred through a mesh of switching nodes which are interconnected by communication links in a variety of patterns. The mesh interconnection pattern can allow for a number of paths to be available through the network from each computer system or other device which may transmit information as a source device, to another computer system or other device, which is to receive the information as a destination device, so that if one switching node or communication link is congested or inoperative, the information can be routed around the congested or inoperative portion of the network.

Information transferred from a source device to a destination device is generally transferred in the form of fixed- or variable-length packets, which are transferred through the network in accordance with one of several general packet transfer methodologies. In one packet transfer methodology, termed a "connectionless" data transfer methodology, each information packet that is transmitted by a source device to a destination device includes, in addition to the information to be transferred, destination address information which identifies the particular device that is to receive the packet, along with an identifier identifying the particular switching node to which the destination device is connected. Each switching node in the network is provided with a database that stores network topology information, which describes the entire topology of the network, and a routing table that provides, among other information, routing information identifying the path to be taken from the switching node to any other switching node in the network. When a switching node receives a packet that is to be transferred to a particular destination device, it (that is, the switching node) will use the routing table to identify a communication link over which the packet is to be transmitted.

Each switching node that receives the packet will perform a similar operation, until the packet is transferred to a switching node which is connected to the destination device. At that point, the switching node will identify the particular communication link connected between it and the destination device, and will transfer the packet to the destination device. Similar operations occur for each packet transferred through the network, so that each switching node will make a routing decision, to identify a particular communication link over which it is to transfer each packet that it receives, for each packet. The routing decision is overhead that may delay delivery of packets to their respective destinations, but if the packet traffic between particular source and destination devices is relatively low, which may be the case if the network allows relatively large packets to be transferred, and if the delay in delivery is not critical, the connectionless methodology can provide good service. On the other hand, since each switching node makes a routing decision effectively "on-the-fly" for each packet, if a portion of the network becomes congested or otherwise unavailable, each switching node can easily take that into account in its routing decision.

Another packet transfer methodology alleviates the necessity of requiring the switching nodes to make an "on the fly" routing decision for each of the packets which they receive. In this packet transfer methodology, packets are transferred through the network's switching nodes over constructs which are generally termed "virtual circuits," "virtual connections" and the like (generally, "virtual circuits"). When a source device wishes to transfer information to a destination device, initially a preliminary operation will be performed to establish a virtual circuit over communication links defining a path from the source device, through a series of switching nodes to the destination device. As with the connectionless methodology, each switching node that operates using the virtual circuit methodology may include a network topology database that stores network topology information, which describes the entire topology of the network as well the identifiers for the various destination devices and the switching nodes to which they are connected, which network topology database can be used to assist in identifying a path through the various switching nodes of the network for the virtual circuit.

In addition to the network topology database, each switching node in the virtual circuit methodology will also be provided with a virtual circuit database that associates each of the virtual circuits maintained by the respective switching node with a particular one of the communication links. After a virtual circuit is established, the source device can transfer packets using the virtual circuit database Each packet will include, as well as the data to be transferred, an identifier that identifies the particular virtual circuit to be used in transferring the packet. The source device will initially transfer the packet to the switching node connected thereto, and that switching node will use virtual circuit identifier and the virtual circuit database to identify a communication link over which it (that is, the switching node) is to transfer the packet. These operations will be performed for each switching node along the virtual circuit which receives the packet. When the last switching node along the virtual circuit receives the packet, that switching node will transfer the packet to the particular destination device associated with the virtual circuit. These operations will be repeated for each of the packets transferred from the source device to the destination device. In addition, similar operations may also be performed in connection with packets which the destination device may transfer to the source device, since a single virtual circuit, once established, may be used to transfer packets in both directions between the original source device and the original destination device.

At the end of a communications session between the source device and the destination device, in which one or a number of packets may be transferred, the devices may close the virtual circuit. In that operation, packets are transferred between the source and destination devices which, among other things, can enable the switching nodes along the virtual circuit to expunge the virtual circuit information relating to the particular virtual circuit being closed from their respective virtual circuit databases. Thereafter, the virtual circuit identifier and other resources, including the entries in the respective virtual circuit databases associated with the closed virtual circuit, can be used for other virtual circuits.

There are several benefits of using the virtual circuit methodology in some environments. One benefit is that, in the virtual circuit methodology, routing decisions at each switching node need only be made while a virtual circuit is being established, instead of each time a packet is received which is to be transferred to a particular destination device as in the connectionless methodology. However, as indicated above, there is some overhead in the message traffic and routing decisions which are required to establishing a virtual circuit and in closing the virtual circuit at the end of the communications session. This overhead can be effectively amortized if the network is such that a significant amount of packet traffic between source devices and destination devices is expected during a communication session. However, if transfer of only a few packets are expected during most sessions, the overhead may not be satisfactorily amortized.

In addition, in the virtual circuit methodology, the switching nodes need to maintain the additional virtual circuit database, whose capacity places an effective limit on the number of simultaneous virtual circuits that a single switching node can handle. This problem can be exacerbated since the various pairs of source and destination devices can have multiple virtual circuits therebetween, information for each of which will need to be provided in the virtual circuit database.

A further problem that can arise in a network constructed in accordance with the virtual circuit methodology is as follows. If a disruption occurs in the network, which may occur if, for example, a particular communication link interconnecting switching nodes malfunctions, the virtual circuits which use the particular communication link will need to be re-established over other communication links, requiring the various devices and switching nodes to repeat the establishment phase before the virtual circuits can again be used, which, in turn, can delay communications. In a network constructed in accordance with the connectionless methodology, since routing decisions are made "on the fly," a network disruption may not result in a similar communication delay.

SUMMARY OF THE INVENTION

The invention provides a new and improved system and method for transferring packets in a "connectionless" network.

In brief summary, the new network comprises a plurality of devices interconnected by a plurality of switching nodes. At least one device, as a source device, generates device packets for transfer to other devices, as destination devices, with each device packet including an address portion including an address identifying at least one of the destination devices. The switching nodes establish respective virtual circuits thereover for transferring virtual circuit packets from at least one the switching node, as an originating switching node, which is connected to the source device, to others of the switching nodes, as respective terminating switching nodes, each of which is connected to a destination device. The originating switching node receives each device packet from the source device and generates a respective virtual circuit packet therefor, each virtual circuit packet including a virtual circuit identifier identify one of the virtual circuits over which the virtual circuit packet is to be transferred, and transferring the respective virtual circuit packet over the virtual circuit. Successive switching nodes associated with each virtual circuit, as intermediate switching nodes, receive the virtual circuit packets and use the virtual circuit identifier in each packet to determine routing for the virtual circuit packet. Each terminating switching node, upon receipt of a the virtual circuit packet, extract the device packet and, using the address identifying the destination device, transfer the device packet to the identified destination device.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 4 depicts a functional block diagram of a switching node useful in the network depicted in FIG. 1.

DETAILED DESCRIPTION OF AN ILLUSTRATIVE EMBODIMENT

Figure 1:
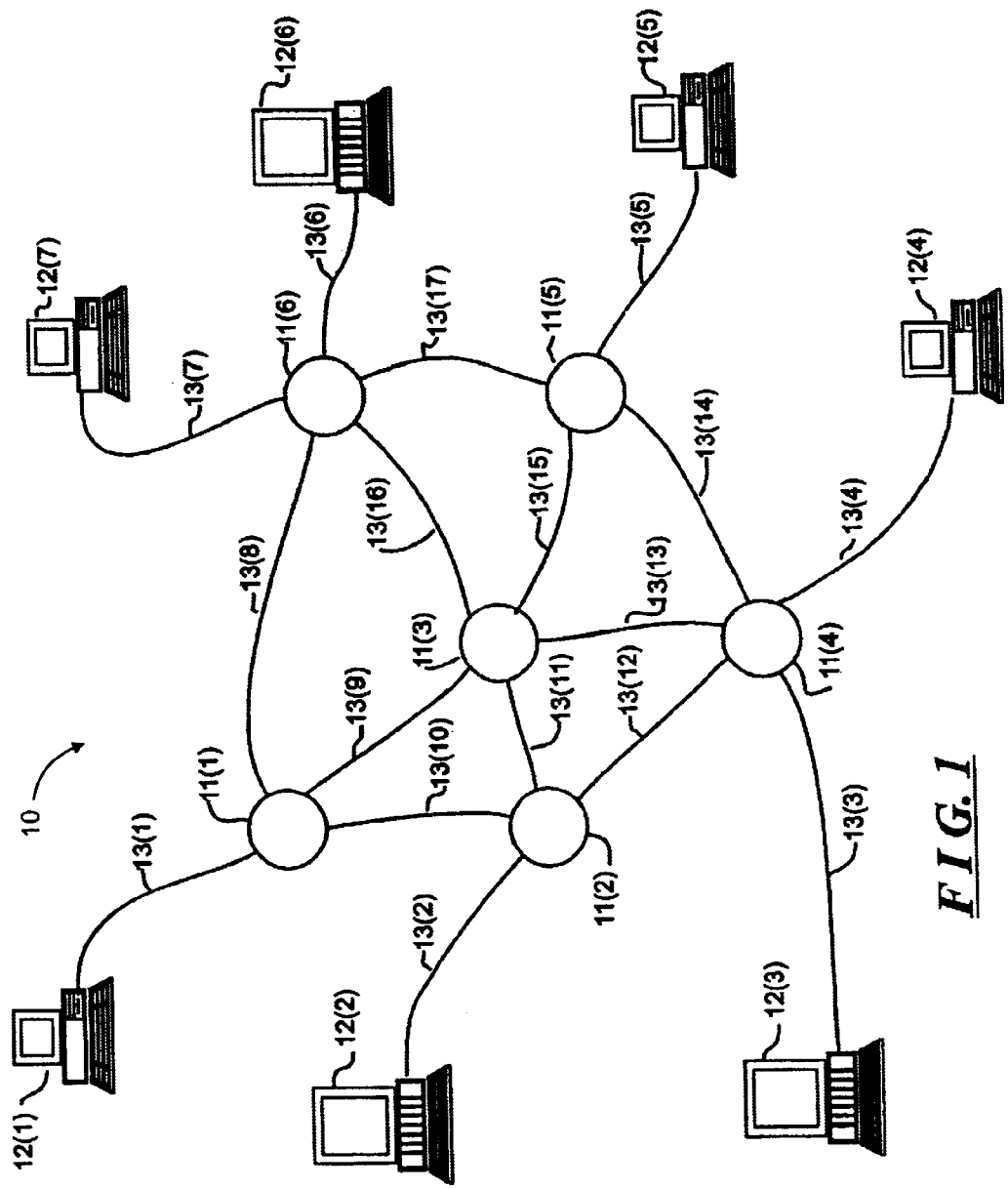
FIG. 1 schematically depicts a computer network constructed in accordance with the invention.

FIG. 1 schematically depicts a computer network 10 including a plurality of switching nodes 11(1) through 11(N) (generally identified by reference numeral 11(n)) for transferring signals representing data among a number of devices, which in FIG. 1 are represented by computer systems 12(1) through 12(M) (generally identified by reference numeral 12(m)). The computer systems 12(m), as is conventional, process data, in accordance with their program instructions to generate processed data. In their processing, a computer system 12($m_S$) (subscript "S" referencing "source") may, as a source computer system, need to transfer data, processed data and/or program instructions (all of which will be referred to herein generally as "information") to another, destination, computer system 12($m_D$) (subscript "D" referencing "destination"), which may use the transferred information in its operations.

Each computer system 12(m) is connected over a communication link, generally identified by reference numeral 13(p), to a switching node 11(n) to facilitate transmission of data thereto or the reception of data therefrom. The switching nodes 11(n) are interconnected by communication links, also generally identified by reference numeral 13(p) to facilitate the transfer of information among the respective switching nodes 11(n). The communication links 13(p) may utilize any convenient information transmission medium, including, for example, wires for carrying electrical signals, fiber optic links for carrying optical signals, and so forth. Each communication link 13(p) is preferably bi-directional, allowing the switching nodes 11(n) to transmit and receive signals among each other and with computer systems 12(m) connected thereto over the same link; depending on the particular type of medium selected for respective communication links 13(p), multiple media may be provided for transferring signals in opposite directions.

In one embodiment, the computer systems 12(m), as source computer systems 12($m_S$) provide information for transfer, organized in packets which are structured according to the well-known "SMDS" ("Switched Multi-megabit Data Service") transfer methodology. In addition, computer systems $12(m)$ which, as destination computer systems $12(m_D)$, are to receive the packets, expect to receive such SMDS packets. In the SMDS transfer methodology, packets are normally transferred according to the "connectionless" transfer methodology, in which each packet provided by a source computer system $12(m_S)$, for transfer to a destination computer system $12(m_D)$, includes a network address that includes a high-order portion, termed herein a "prefix" that identifies the particular switching node $11(n)$ to which the destination computer system $12(m_D)$ is connected, as well as a "suffix" that identifies the destination computer system $12(m_D)$ itself. As described above, in a network which operates in accordance with the connectionless transfer methodology, each switching node that receives a packet will use the network address of the destination computer system $12(m_D)$ and information from a routing table to identify a communication link $13(p)$ connected thereto over which it will transfer the packet.

In accordance with the invention, however, in the network 10, the various switching nodes $11(n)$ establish virtual circuits thereamong, which virtual circuits are organized and constructed from each switching node $11(n)$, as an originating switching node $11(n_O)$, that is connected to a computer system $12(m)$ that can operate as a source computer system $12(m_S)$, to each switching node, as a terminating switching node $11(n_T)$, that is connected to a computer system $12(m)$ that can operate as a destination computer system $12(m_D)$. As will be described below in detail, the switching nodes $11(n)$ establish virtual circuits thereamong automatically, independently of the receipt of message packets from any of the computer systems $12(m)$ connected thereto. Depending on the particular path selected for a virtual circuit, the virtual circuit may extend directly from the originating switching node $11(n_O)$ to the terminating switching node $11(n_T)$, if a communication link $13(p)$ connects the originating and terminating switching nodes $11(n_O)$ and $11(n_T)$ directly together, or the virtual circuit may extend over one or more intermediate switching nodes $11(n_I)$ if the originating and terminating switching nodes $11(n_O)$ and $11(n_T)$ are not connected directly together.

Thus, for example, if computer system $12(1)$ can operate as a source computer system, switching node $11(1)$ connected thereto will establish virtual circuits from itself, as an originating switching node, to switching nodes $11(2)$, $11(4)$, $11(5)$ and $11(6)$, as terminating switching nodes, if at least one computer system connected to the respective switching node $11(2)$, $11(4)$, $11(5)$ and $11(6)$ can operate as a destination computer system. For the virtual circuit extending from switching node $11(1)$ to switching node $11(4)$, since switching nodes $11(1)$ and $11(4)$ are not connected directly by a common communication link $13(p)$, the virtual circuit will extend over an intermediate switching node $11(n_I)$, which will likely comprise either switching node $11(2)$ or $11(3)$. Similarly, for the virtual circuit extending from switching node $11(1)$ to switching node $11(5)$, since switching nodes $11(1)$ and $11(5)$ are not connected directly by a common communication link $13(p)$, the virtual circuit will extend over an intermediate switching node $11(n_I)$, which will likely comprise either switching node $11(3)$ or $11(6)$. Similarly, virtual circuits will be established from each of the switching nodes $11(2)$, $11(4)$, $11(5)$ and $11(6)$ which is connected to at least computer system that can operate as a source computer system $12(m_S)$, to each of the other switching nodes which is connected to a computer system that can operate as a destination computer system $12(m_D)$.

Figure 3:
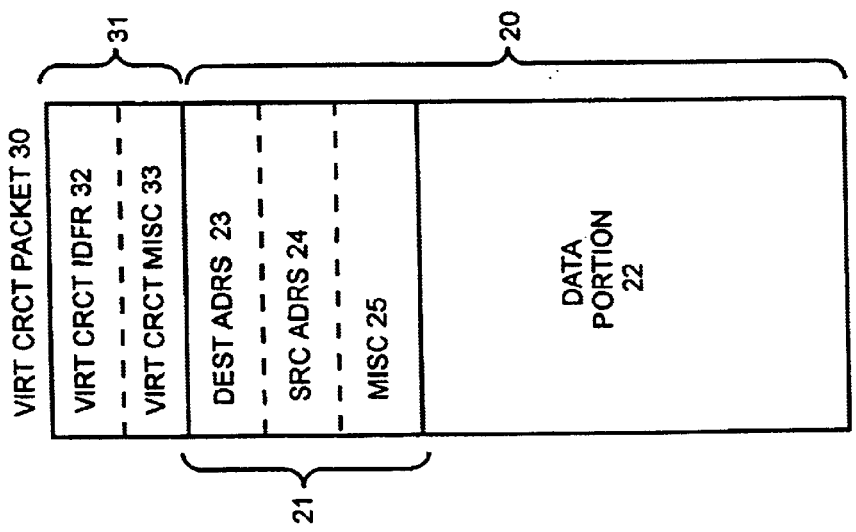
FIGS. 2 and 3 depict structures of several types of message packets used in the network depicted in FIG. 1, which is useful in understanding the invention.

After the switching nodes $11(n)$ have established the respective virtual circuits, when a computer system operating as a source computer system $12(m_S)$ provides a packet to the switching node $12(n)$ connected thereto to be transferred to a destination computer system $12(m_D)$, the packet, which will be termed a "device packet," will include the network address, including the prefix that identifies the switching node $11(n)$ connected to the destination computer system $12(m_D)$, as well as the suffix that identifies the destination computer system $12(m_D)$ itself. The structure of device packets used in the network 10 will generally be described below in connection with FIG. 2. The switching node $11(n)$ which receives the device packet from the source computer system $12(m_S)$ will, as originating switching node $11(n_O)$:

(1) use the prefix to identify the virtual circuit between it (that is, the originating switching node $11(n_O)$ that which receives the device packet) and the switching node $11(n')$ which, as terminating switching node $11(n_T)$ is connected to the destination computer system $12(m_D)$, (2) embed the device packet in a virtual circuit packet, which includes a virtual circuit identifier (the structure of virtual circuit packets used in the network 10 will generally be described below in connection with FIG. 3), and (3) transfer the virtual circuit packet over the communication link that is associated with the particular virtual circuit identified by the virtual circuit identifier in the virtual circuit packet.

Thereafter, each switching node $11(n)$ which receives the virtual circuit packet, up to the terminating switching node $11(n_T)$ along the virtual circuit, will use the virtual circuit identifier in the virtual circuit packet to identify the communication link $13(p)$ connected thereto over which it (that is, the respective switching node $11(n)$) will transfer the virtual circuit packet. When the terminating switching node $11(n_T)$ receives the virtual circuit packet, it (that is, the switching node $11(n)$) will extract the original device packet from the virtual circuit packet and use the suffix of the destination network address contained therein to identify the particular destination computer system $12(m_D)$ that is to receive the device packet. Thereafter, the switching node $11(n_T)$ can provide the device packet to the destination computer system $12(m_D)$.

As a specific example, if, for example, computer system $12(1)$, as source computer system, is to transfer information to computer system $12(5)$, as destination computer system, it (that is, computer system $12(1)$) will generate a device packet including the information to be transferred and a destination address that identifies computer system $12(5)$ as the destination computer system and switching node $11(5)$ as the switching node connected to the destination computer system, and provide the device packet to the switching node $11(1)$ connected thereto. The switching node $11(1)$, in turn, instead of using the destination address to make a routing decision to identify the next switching node along a path to the destination computer system $12(5)$ and transferring the device packet to that switching node, as is conventional in the connectionless packet transfer methodology, will identify the one of the previously-established virtual circuits to be used for transferring information to the terminating switching node $11(n_T)$, namely, switching node $11(5)$, that is connected to the destination computer system $12(5)$. In addition, the switching node $11(1)$ will generate a virtual circuit packet for the device packet, embed the device packet in the virtual circuit packet, provide a virtual circuit identifier identifying the virtual circuit in the virtual circuit packet, and transmit the virtual circuit packet over the communication link connected thereto to the intermediate switching node that forms part of the path defining the virtual circuit. If, for example, the virtual circuit extending from originating switching node 11(1) to terminating switching node 11(5) includes switching node 11(3) as intermediate switching node, the switching node 11(1) will transmit the virtual circuit packet over communication link 13(9) to the switching node 11(3).

When the switching node 11(3) receives the virtual circuit packet from switching node 11(1), it will use the virtual circuit identifier in the virtual circuit packet to identify one of the communication links 13(p) connected thereto over which it is to transfer the virtual circuit packet to the next switching node along the virtual circuit, in this case, communication link 13(15) connected to switching node 11(5). When switching node 11(5) receives the virtual circuit packet, since it is the terminating switching node 11($n_T$) for the virtual circuit, it will extract the device packet from the virtual circuit packet, use the destination address in the device packet to identify the destination computer system 12(5) to receive the device packet, and transfer the device packet over the communication link 13(5) to that computer system. It will be appreciated that, since the switching nodes 11(1) and 11(3) use the pre-established virtual circuit from originating switching node 11(1) to the terminating switching node 11(5) in transferring the virtual circuit packet, they do not need to make respective routing path decisions when they receive the virtual circuit packet, which can result in enhanced efficiency in the transfer of information from the source computer system 12(1) to the destination computer system 12(5). Similar operations will be performed in connection with other information transfers between respective source and destination computer systems 12($m_S$) and 12($m_D$).

It will be appreciated that the various switching nodes 11(n) comprising the network 10 will perform a number of operations to enable them to perform the operations generally described above. Details of operations performed by the switching nodes 11(n) in connection with the invention will be described below in connection with FIG. 5. Generally, the switching nodes 11(n) will perform such operations as:

(i) establishing virtual circuits over which the virtual circuit packets will be transferred;

(ii) adding virtual circuits if necessary as new switching nodes 11(n) are added to the network;

(iii) deleting virtual circuits as switching nodes 11(n) are, for example, removed from the network or are unable to support virtual circuits therethrough, or as communication links 13(p) become inoperative, which may necessitate establishing substitute virtual circuits using other communication links or switching nodes; and (iv) using the virtual circuits to transfer information between respective computer systems 12(m).

To assist in these operations, each switching node 11(n) periodically broadcasts "advertising" messages identifying it, communication links 13(p) connected thereto and the other switching nodes that are connected to those communication links 13(p). Each switching node 11(n) that receives the advertising messages can use the advertising messages to assemble a database that describes the topology of the network, that is, all of the switching nodes 11(n), their communication links 13(p) interconnecting each switching node to other switching nodes and the communication links 13(p) which interconnect the respective switching nodes 11(n) and the computer systems 12(m) and generate a routing table identifying the particular series of communication links 13(p) defining the path from it (that is, the respective switching node 11(n)) to other switching nodes 11(n') (n'≠n) in the network 10. Each switching node 11(n) which is connected directly over a communication link 13(p) to a computer system 12(m) can use the routing table to identify other switching nodes 11(n') (n'≠n) and initiate establishment of a virtual circuit therewith.

When each switching node 11(n) receives a broadcast advertising message, it can use the contents of the message and the information in its network topology database and/or routing table to determine, for example, whether the topology of the network has changed, and if so establish or update virtual circuits as necessary. For example, if a received broadcast advertising message indicates that a switching node 11(n) (n'≠n) has been added to the network, the switching node 11(n) that receives the broadcast advertising message may determine whether it will need to initiate establishment a virtual circuit to that switching node 11(n') and, if it makes a positive determination, proceed to establishment of the virtual circuit. The switching node 11(n) may determine that a virtual circuit will be established to the switching node 11(n') if, for example, the switching node 11(n') is connected directly to one or more computer systems 12(m) over respective communication links 13(p).

In addition, if a switching node 11(n) receives a broadcast advertising message from a switching node 11(n') (n'≠n) indicating that a computer system 12(m) has been newly connected to the switching node 11(n'), the switching node 11(n) will (i) determine whether a virtual circuit exists from the switching node 11(n) to the switching node 11(n') and, if not, initiate establishment of a new virtual circuit to the switching node 11(n'). It will be appreciated that these operations will be performed by switching nodes 11(n) which themselves are connected to computer systems 12(m) which may operate as source computer systems 12($m_S$).

Furthermore, if a switching node 11(n) receives a broadcast advertising message from a switching node 11(n') (n'≠n) indicating that a particular communication link 13($p_x$) is malfunctioning or otherwise unavailable, it (that is, the switching node 11(n)) can the network topology database to indicate that the communication link 13($p_x$) is unavailable. In addition, the switching node 11(n) can determine whether it (that is, the switching node 11(n)) is the originating switching node for a virtual circuit that utilizes the unavailable communication link 13($p_x$). For each virtual circuit the switching node 11(n) is the originating switching node that utilizes the unavailable communication link 13($p_x$), the switching node 11(n) will attempt to reestablish a virtual circuit between it and the terminating switching node 11($n_T$) in the same manner as described above, taking into account the fact that the particular communication link 13($p_x$) is unavailable.

It will be appreciated that network 10 constructed in accordance with the invention provides a number of advantages. In particular, it provides a number of advantages which would be provided by a network that is constructed to transfer packets according to the virtual circuit packet transfer methodology to devices, represented by the computer system 12(m) depicted in FIG. 1, which transmit and receive packets according to the connectionless packet transfer methodology. For example, the network allows that packets may be transferred by the respective switching nodes 11(n) along the respective virtual circuit from the originating switching node 11($n_O$) to the terminating switching node 11($n_T$) without requiring each of the switching nodes along the virtual circuit to make a routing calculation for each such packet. In addition, the invention can provide enhanced packet transfer service over the service provided by network constructed to transfer packets according to the virtual circuit packet transfer methodology, since the switching nodes 11(n) will maintain the virtual circuits, the delay in transferring information due to the overhead required in establishing virtual circuits will be reduced.

Figure 2:
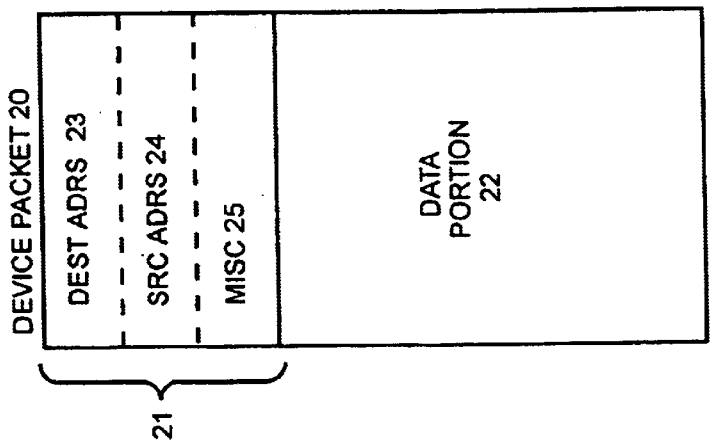

With this background, the invention will be described in detail in connection with FIGS. 2 through 5. FIGS. 2 and 3 depict detailed structures for the device and virtual circuit packets, respectfully. As indicated above, a device packet is transferred from the source computer systems $12(m_S)$ to the originating switching node $11(n_O)$ connected thereto, and to the destination computer system $12(m_D)$ by the terminating switching node $11(n_T)$ connected thereto. The originating switching node $11(n_O)$ will embed the device packet in a virtual circuit packet, and transfer the virtual circuit packet to the terminating switching node $11(n_T)$ over the virtual circuit. FIG. 4 depicts a functional block diagram of a switching node 11(n) used in the network 10, and in particular depicts details of various data structures, including the routing table, a prefix/virtual circuit table, and the virtual circuit database. Finally, FIG. 5 contains a flow diagram illustrating operations performed by the various switching nodes 11(n) in accordance with the invention.

With reference to FIG. 2, the computer systems 12(m) transmit and receive data in the form of variable-length packets, one of which, identified by reference numeral 20, is depicted in schematic form in FIG. 2 With reference to FIG. 2, in the SMDS data transfer methodology, a packet to be transmitted from a source computer system $12(m_S)$ to a destination computer system $12(m_D)$, which will be identified herein as a "device packet 20," includes a header portion 21 and a data portion 22. The data portion 22 contains the actual data to be transmitted from the source computer system $12(m_S)$ to the destination computer system $12(m_D)$.

The header portion 21 includes one or more fields which contain, among other information, routing control information which the switching nodes 11(n) can typically use in routing the packet 20 from the source computer system $12(m_S)$ to the destination computer system $12(m_D)$. In particular the header portion 21 includes a destination address field 23, which contains a value corresponding to the network address for the destination computer system $12(m_D)$, or a similar identifier which can be used to identify the destination computer system $12(m_D)$. Generally in the SMDS methodology, as indicated above, the destination address includes the high-order "prefix" portion that provides an identifier for the node that is connected to the particular destination computer system $12(m_D)$, as well as the low-order "suffix" portion that identifies the destination computer system $12(m_D)$ itself In addition, the header portion 21 will generally include a source address field 24 and one or more miscellaneous fields generally identified by reference numeral 25. The source address field 24 contain a value corresponding to the network address for the source computer system $12(m_S)$, or a similar identifier which can be used to identify the source computer system $12(m_S)$. The miscellaneous fields 25 may contain a variety of types of protocol information, such as, for example, packet type information identifying the type of packet, which may assist the switching nodes 11(n) and destination computer system $12(m_D)$ in, for example, identifying the various fields of the header portion 21 and the data portion 22. In addition, the miscellaneous fields 25 may contain information which may be used to specifically identify a particular application at the destination computer system $12(m_D)$ which is to receive and process the data provided in the data portion 22, and the like. It will be appreciated that the sequence of the various fields 23 through 25 in the header 21 may differ from that depicted in FIG. 2, and that various ones of the miscellaneous fields 25 may be situated throughout the header portion 21.

As described above, the switching nodes 11(n) receive the device packets 20 from the various computer systems 12(m) and embed them in a virtual circuit packet. FIG. 3 depicts details of a virtual circuit packet 30 useful in connection with the invention. With reference to FIG. 3, virtual circuit packet 30 includes a virtual circuit packet header portion 31 followed by a portion that comprises the device packet 20, including the device packet's header portion 21 and data portion 22. The virtual circuit packet header 31 comprises fields which contain information which is used by the switching nodes 11(n) transferring the viral circuit packet 30 over the virtual circuit. In particular, the virtual circuit packet header 31 includes a virtual circuit identifier field 32, which identifies the particular virtual circuit over which the virtual circuit packet 30 is to be transferred. In addition, the virtual circuit packet header 31 may also include one or more virtual circuit packet miscellaneous information fields, generally identified by reference numeral 33, which contain protocol information which is used by the switching nodes 11(n) in transferring the packet 30. The protocol information contained in the miscellaneous information fields 33 may include such information as an identifier identifying the packet 30 as a virtual circuit packet, length information identifying the length of the packet, and other information which may be useful in facilitating the transfer of the packet 30 over the virtual circuit. It will be appreciated that the ordering of the fields 32 and 33 in the header 31 may differ from that depicted in FIG. 3, and that one or more of the miscellaneous fields 33 may be situated ahead of the virtual circuit identifier field 32.

A functional block diagram of a switching node 11(n) useful in connection with the invention is depicted in FIG. 4. With reference to FIG. 4, the switching node 11(n) includes a packet processing and switching fabric subsystem 40 which operates under the control of a control subsystem 41. The packet processing and switching fabric subsystem 40 receives packets from ones of the communication links 13(p) connected thereto as input communication links generally identified by reference numeral 42. The packet processing and switching fabric subsystem 40 may receive both device packets 20 (received from computer systems 12(m) which are connected thereto) and virtual circuit packets 30 (received from other switching nodes 11(n') which are connected thereto) as described above in connection with FIGS. 2 and 3. In addition, the packet processing and software fabric subsystem 40 may receive the broadcast advertising packets and various other types of network control packets, including virtual circuit establishment packets which are used to establish virtual circuits over the network 10. Under control of the control subsystem 41:

(i) if the packet processing and switching fabric subsystem 40 receives a device packet 20, it will embed the device packet 20 in a virtual circuit packet 30, and transmit the virtual circuit packet 30 over one of the output communication links 43 associated with the virtual circuit;

(ii) if the packet processing and switching fabric subsystem 40 receives a virtual circuit packet 30:

(a) if the switching node, 11(n) is an intermediate switching node along the virtual circuit, it will transmit the virtual circuit packet 30 over one of the output communication links 43 associated with the virtual circuit, as identified by the control subsystem 41 but (b) if the switching node is the terminating switching node 11($n_T$) along the virtual circuit, it will process the virtual circuit packet 30 to extract the device packet 20 embedded therein and transmit the extracted device packet 20 to the destination computer system 12($m_D$) over one of the output communication links 43, as identified by the control subsystem 41;

(iii) if the packet processing and switching fabric subsystem 40 receives a broadcast advertising packet, it will pass the information in the packet to the control subsystem 41, and, depending on the particular methodology by which the advertising packets are broadcast through the network 10, it (that is, the subsystem 40) may also transmit the advertising packet over one or more of the output communication links 43, and (iv) if the packet processing and switching fabric subsystem 40 receives a virtual circuit establishment packet, it will pass the information in the packet to the control subsystem 41.

If the control subsystem 41 receives broadcast advertising packet information from the packet processing and switching fabric subsystem 40 (item (iii) above), it will use the information to update the network topology database (not shown) and a routing table 44 generated therefrom, as necessary. As will be described below in greater detail in connection with FIG. 4, the routing table 44 that the control subsystem 41 maintains for its switching node 11($n$) generally identifies, for each prefix value that is associated with a switching node 11($n'$) ($n' \neq n$), the particular one of the communication links 13($p$) connected to the switching node 11($n$) over which message packets received by the switching node 11($n$) are to be transmitted. It will be appreciated that the series of communication links 13($p_1$), 13($p_2$) ... 13($p_T$) starting from an originating switching node 11($n$O) effectively defines a path to a terminating switching node 11($n$T), and so if a broadcast advertising packet indicates that one of the communication links 13($p_x$) has failed, a substitute path that does not use the failed communication link 13($p_x$) may need to be established. If, in addition to updating the routing table 44, the control subsystem 41 also initiates rerouting of a virtual circuit to another switching node 11($n'$), it (that is the control subsystem 41) will also update a prefix/virtual circuit table 46 which associates particular prefixes with particular virtual circuits for which the switching node 11($n$) is the originating switching node 11($n$O). In addition, if the control subsystem 41 receives one or more packets enabling establishment of a virtual circuit from the packet processing and switching fabric subsystem 40 (item (iv) above), it (that is, the control subsystem 41) will perform predetermined operations to facilitate establishment of the virtual circuit, which may include updating of the virtual circuit table, which is identified in FIG. 4 by reference numeral 45, and generation of additional such packets for transmission by the packet processing and switching fabric 40.

The packet processing and switching fabric subsystem 40 includes several sections, including a packet receive interface 50, a packet transmission interface 51, a packet processing section 52 and a packet switching section 53. The packet receive interface 50 receives packets from the input communication links 42 and provides them to the packet processing section 52. Generally, the packet processing section 52 receives the packets from the packet receive interface 50, performs selected processing operations, as will be described below, enables packets to be coupled by the packet switching section 53 to the packet interface 51 for transmission over respective output communication links 43 as identified by the control subsystem 41.

As noted above, the packet processing section 52 processes packets received from the packet receive interface 50. Particular processing operations performed by the packet processing section 52 for a particular packet will depend on the packet's particular type. Of particular interest in connection with the invention:

(i) If the packet is a device packet 20, the packet processing section 52, in conjunction with the control section 41, will process the device packet 20 to generate a virtual circuit packet 30. The packet processing section 52 will provide to the control subsystem 41 the identifier for the device packet's destination computer system 12($m_D$), which it (that is, the packet processing section 52) obtains from the destination address field 23 (FIG. 2) of the device packet, and the control section will provide the identification of the virtual circuit to be used in transferring the virtual circuit packet 30. Contemporaneously, the control subsystem 41 can also provide other information which may be needed for virtual circuit miscellaneous fields 33. After the packet processing section 52 receives this information, it can load the information in the respective fields 32 and 33 of the virtual circuit packet 30, embed the device packet 20 in the virtual circuit packet 30 to complete the virtual circuit packet 30 and transfer the completed virtual circuit packet 30 to the packet switching section 53.

(ii) If the packet is a virtual circuit packet 30, the packet processing section 52 will transfer the virtual circuit packet 30 to the packet switching section 53 for transmission as described above.

(iii) If the packet is a broadcast advertising packet, the packet processing section 52 will transfer information from the packet to the control subsystem 41. In addition, depending on the advertising packet broadcast methodology for the network 10 and the particular switching node 11, the packet processing section 52 may transfer the broadcast advertising packet to the packet switching section 53 for uni- or multi-cast transmission over one or multiple output communication links 43.

(iv) Finally, if the packet is to enable establishment of a virtual circuit, the packet processing section 52 will transfer information from the packet to the control subsystem 41, which, in turn, can perform selected operations in connection with establishing the virtual circuit.

The control subsystem 41 makes use of several tables, including the routing table 44, virtual circuit table 45 and prefix/virtual circuit tale 46, in controlling processing by the packet processing section 52 and packet switching by the packet switching section 53. As noted above, the control subsystem 41:

(i) provides virtual circuit information that the packet processing section 52 uses in generating a virtual circuit packet 30 when it (that is, the packet processing section 52) receives a device packet 20, (ii) receives advertising packet information provided by the packet processing section 52 when it (that is, the packet processing section 52) receives a broadcast advertising packet, and updates the network topology database (not shown) and tables 44 through 46, and (iii) cooperates with the packet processing section 52 during establishment of a virtual circuit.

As described above, the routing table 44 contains information which associates each switching node 11($n$), generally by the prefix portion of the destination computer system address, with particular output communication link 13(p). The virtual circuit table 45 contains information as to the various virtual circuits which are maintained by the switching node 11(n), that is, the virtual circuits in which the switching node 11(n) is either an originating switching node 11($n_O$), a terminating switching node 11($n_T$) or an intermediate switching node 11(n). In addition, the prefix/virtual circuit table 46 associates particular prefix values identified in the routing table 44 with particular virtual circuits identified in the virtual circuit table 45.

In one embodiment, each switching node 11(n) may be associated with a plurality prefix values along with a separate node identifier that identifies the node itself, and information for each prefix value will be provided in the routing table 44 and prefix/virtual circuit table 46. In that embodiment, if a switching node 11(n) is associated with a plurality of prefix values, the same virtual circuit can be used in connection with message packet transfers to the switching node 11(n)

The routing table 44 includes a number of route specifier entries 60(0) through 60(R) (generally identified by reference numeral 60(r), each of which is associated with one of the prefix values. Each entry 60(r) of the routing table 44 includes a number of fields, including a node/prefix identifier field 61(r), a forward node identifier field 62(r), an output communication link identifier field 63(r), and a path communication links identifiers field 64(r). The node/prefix identifier field 61(r) of each entry 60(r) includes the prefix value for the entry, and the forward node identifier field 62(r) contains the node identifier for the switching node associated with the prefix value. The output communication link identifier field 63(r) contains an identifier for the particular one of the output communication links 43 over which the switching node 11(n) is to transfer a message packet whose destination address contains the prefix value that is identified in the node/prefix identifier field 61(r), and the path communication links identifier field 64(r) contains output communication link identifiers for the series of switching nodes from the switching node 11(n) to the switching node that is associated with the node prefix identifier field 61(r). It will be appreciated that when the switching node 11(n) is to establish a virtual circuit to another switching node 11(n') (n'≠n), it can use the output communication link identifiers in the path communication links identifier field 64(r) to identify the path to the switching node 11(n').

The routing table 44 may also contain route specifier entries 60(r) in which the node/prefix identifier field 61(r) contains, instead of a prefix value, a node identifier for a switching node 11(n). For such an entry 60(r), the forward node identifier field 62(r) may be empty.

The virtual circuit table 45 includes one or more virtual circuit entries 70(0) through 70(C) (generally identified by reference numeral 70(c)), with each entry being associated with a virtual circuit that is maintained by the switching node 11(n). Entry 70(c) includes a number of fields, including a received virtual circuit identifier field 71(c), a local virtual circuit identifier field 72(c), a transmitted virtual circuit identifier field 73(c) and an output communication link identifier field 74(c). In one embodiment, so that the virtual circuit identifier values for a particular virtual circuit do not need to be globally unique over the entire network 10, each virtual circuit that is associated with a particular switching node 11(n) (that is, that originates or terminates at the switching node 11(n) or for which the switching node 11(n) is an intermediate switching node) may be associated with as many as three virtual circuit identifier values, including a first virtual circuit identifier value for virtual circuit packets that are received from another switching node 11(n') (n'≠n), a second virtual circuit identifier value that is used in transferring the virtual circuit packet from the packet receive interface 50 to the packet transmit interface 51, and a third virtual circuit identifier value that is used in transmitting the virtual circuit packet over one of the output communication links 43 to another switching node 11(n") (n"≠n). The contents of the received virtual circuit identifier field 71(c), local virtual circuit identifier field 72(c) and remote virtual circuit identifier field 73(c) are used in providing the first, second and third virtual circuit identifiers, respectively, as described above. In addition, the output communication link identifier field 74(c) identifies the particular one of the output communication links 43 over which a virtual circuit packet associated with the particular virtual circuit is to be transmitted by the packet transmit interface 51. It will be appreciated that, in the entry 70(c) for a virtual circuit for which the switching node 11(n) is the terminating switching node 11(nT) for the virtual circuit, the output communication link identifier field 74(c) can be empty or contain a null identifier which can indicate that it (that is, the switching node 11(n)) is the terminating switching node.

The prefix/virtual circuit table 46 associates particular prefix values identified in the routing table 44 with particular virtual circuits identified in the virtual circuit table 45, and can be used by originating switching nodes 11(nO) during generation of virtual circuit packets 30 (FIG. 3). The prefix/virtual circuit table 46 includes a number of entries 65(0) through 65(P) (generally identified by reference numeral 65(p), each of which is associated with one of the prefix values identified in the routing table 44. Each entry 65(p) includes several fields, including a prefix identifier field 66(p), a node identifier field 67(p), and a virtual circuit identifier field 68(p). The prefix identifier field 66(p) contains a prefix value that corresponds to one of the prefix values in the fields 61(r) of the routing table 44. The node identifier field 67(p), in turn, contains node identifier for the switching node 11(n) associated with the prefix value in the prefix identifier field 66(p), and the virtual circuit identifier field 68(p) contains a virtual circuit identifier for the virtual circuit to be used in transferring virtual circuit packets 30 to the terminating switching node 11(nT).

The control subsystem 41 for a switching node 11(n) uses the entries 65(p) of the prefix/virtual circuit table 46 to provide a virtual circuit identifier for the various virtual circuit packet 30 generated by the switching node 11(n) from respective device packets 20, and it will be appreciated that the virtual circuit identifier in field 68(p) may conveniently correspond to any of the virtual circuit identifiers in fields 71(c), 72(c) or 73(c) of the appropriate entry for the virtual circuit in the virtual circuit table 45. Furthermore, since the entries 65(p) are used during generation of the virtual circuit packets, the table 46 need only include entries 65(p) for virtual circuits for which the switching node 11(n) is the originating switching node 11(nO). If the switching node 11(n) is an intermediate switching node 11(nI) for a virtual circuit, the switching node 11(n) need only make use of the entries 70(c) of the virtual circuit table 45 when forwarding the virtual circuit packets. Similarly, if the switching node 11(n) is the terminating switching node 11(nT) for a virtual circuit, the switching node 11(n) can also determine from the virtual circuit table 45 that it is the terminating switching node; after extracting the device packet 20 from the virtual circuit packet 30, the terminating switching node 11(nT) can thereafter make use of the suffix value in the destination address field 23 to identify the particular destination computer system 12(mD) to receive the device packet 30.

Figure 5:
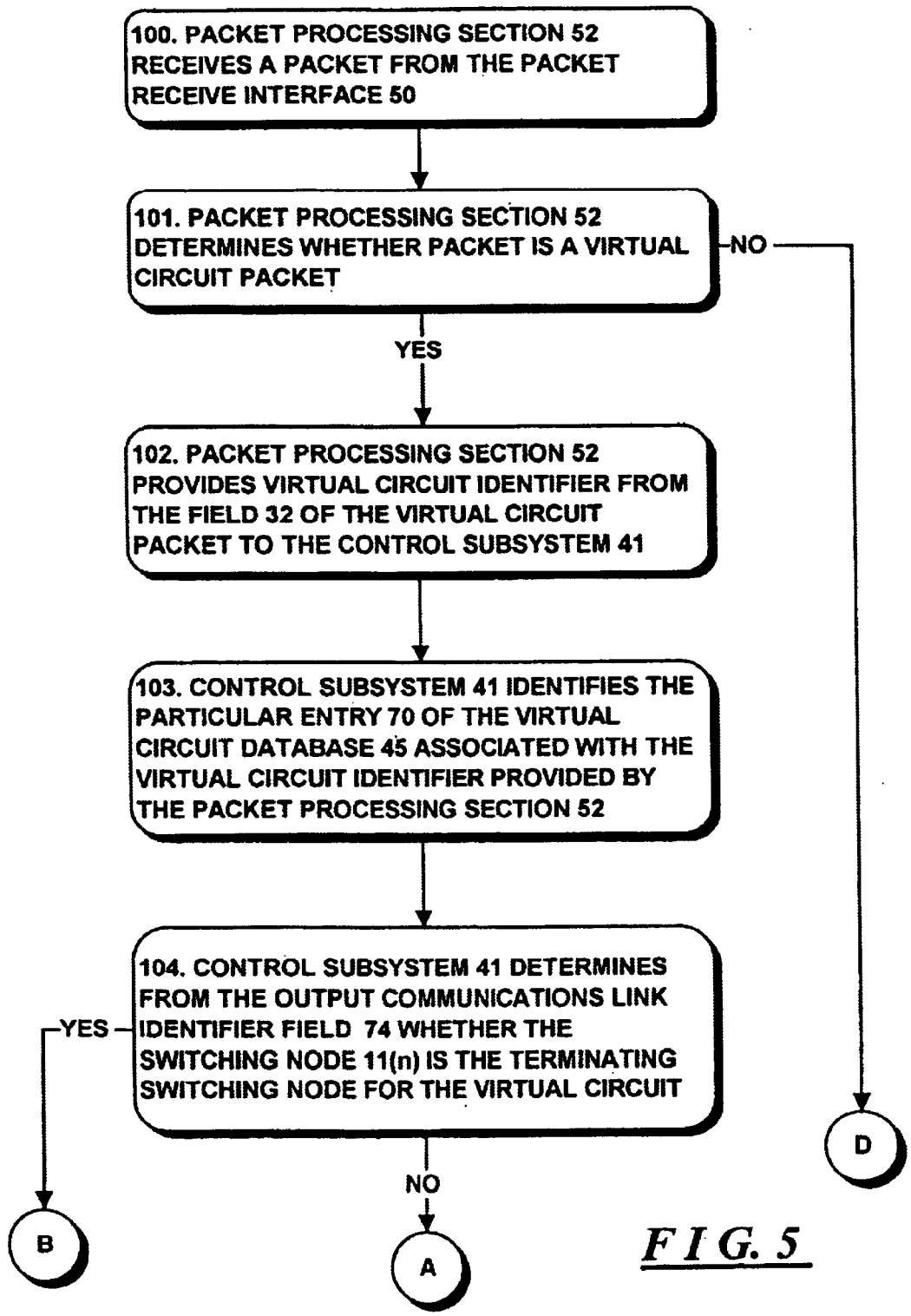
FIG. 5 is a flow chart depicting operations performed by the switching node depicted in FIG. 4, in connection with the invention.
Figure 5A:
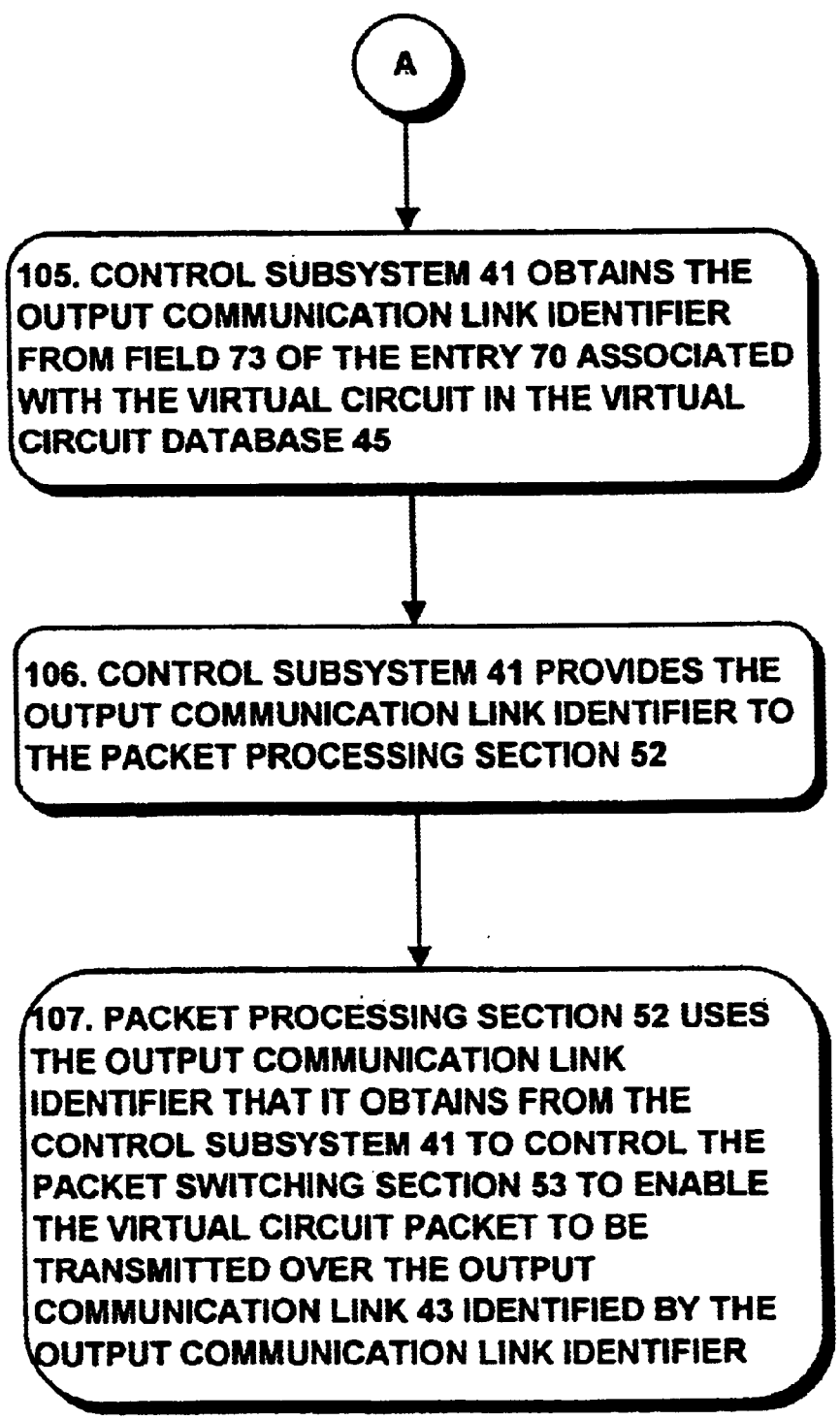
Figure 5B:
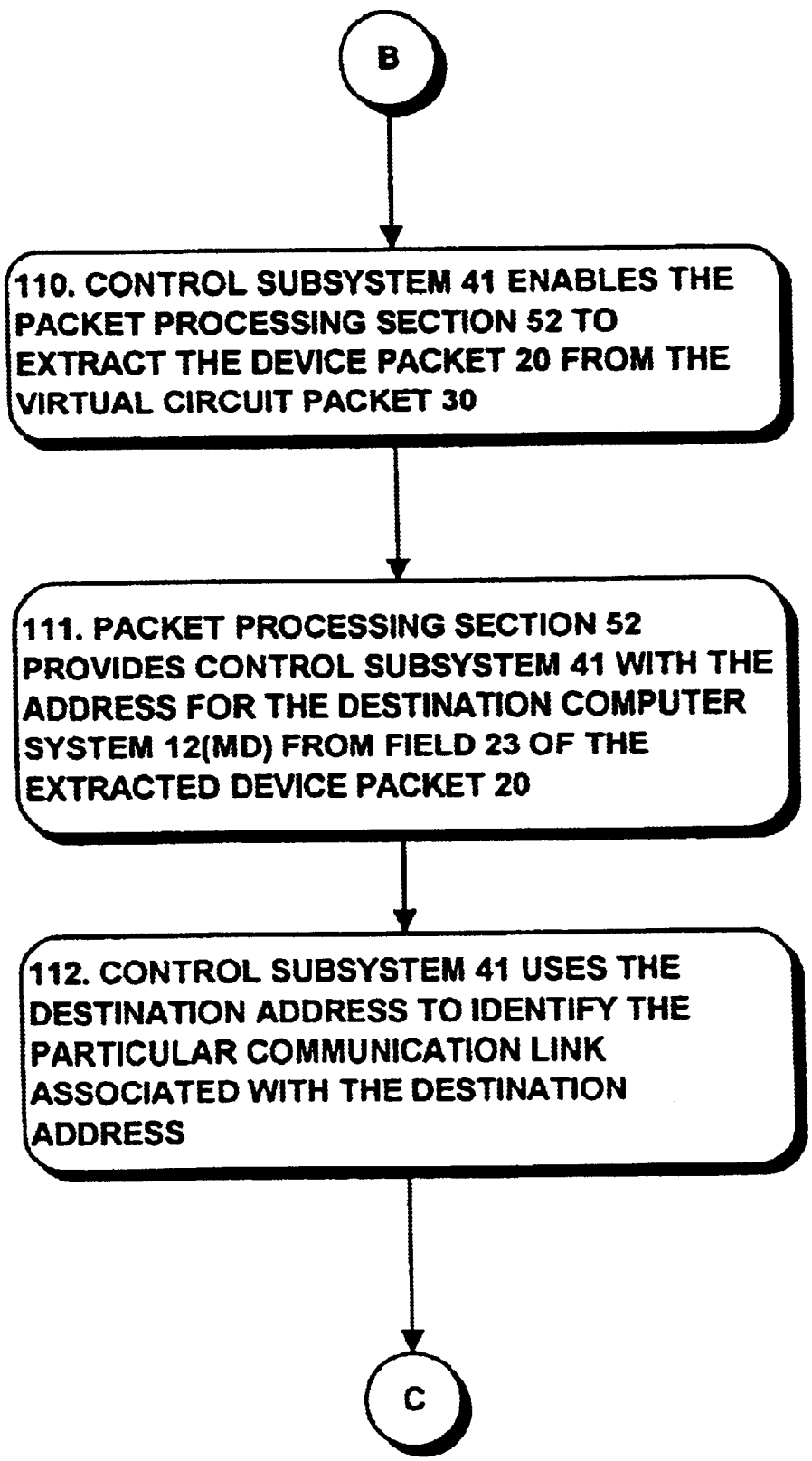
Figure 5C:
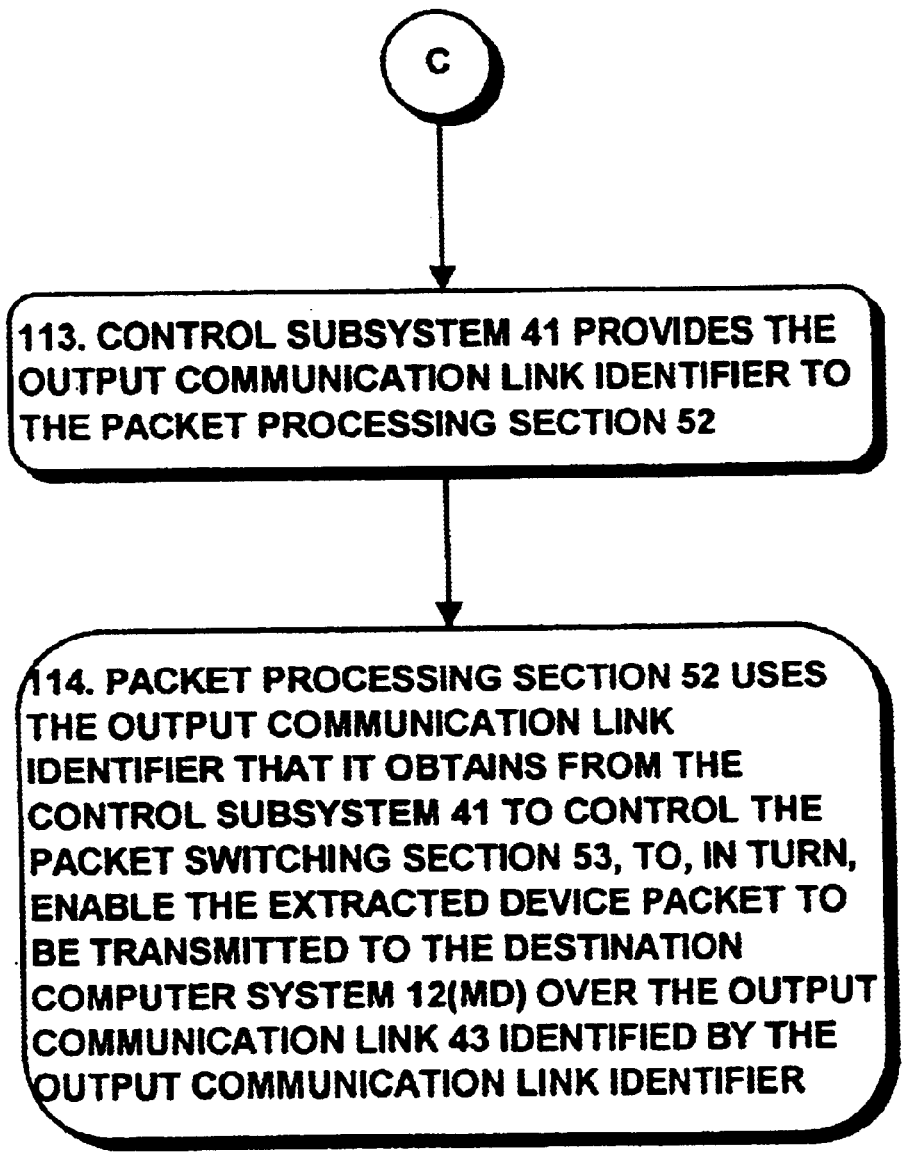
Figure 5D:
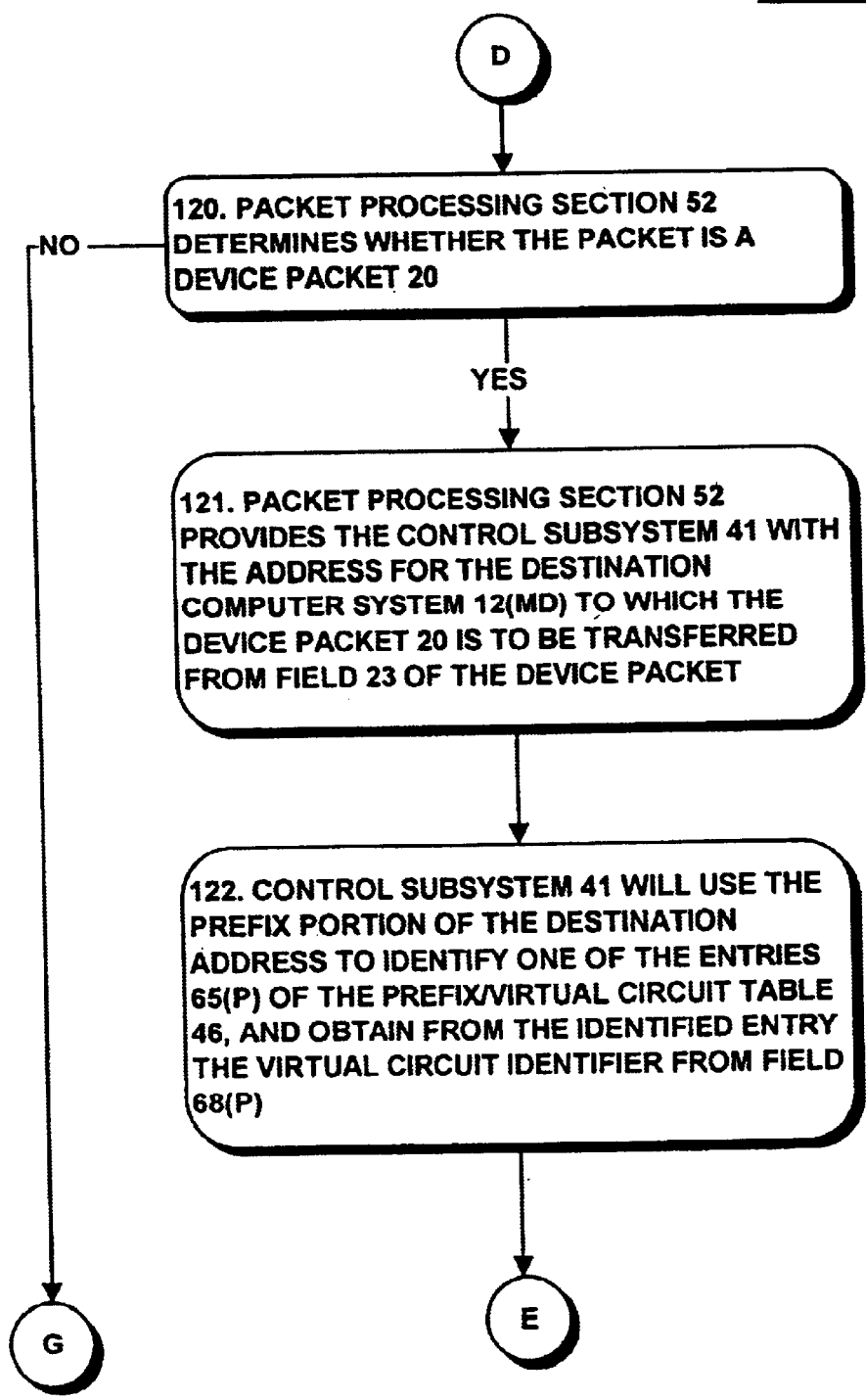
Figure 5F:
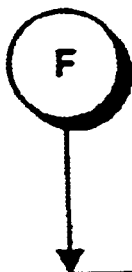
Figure 5G:
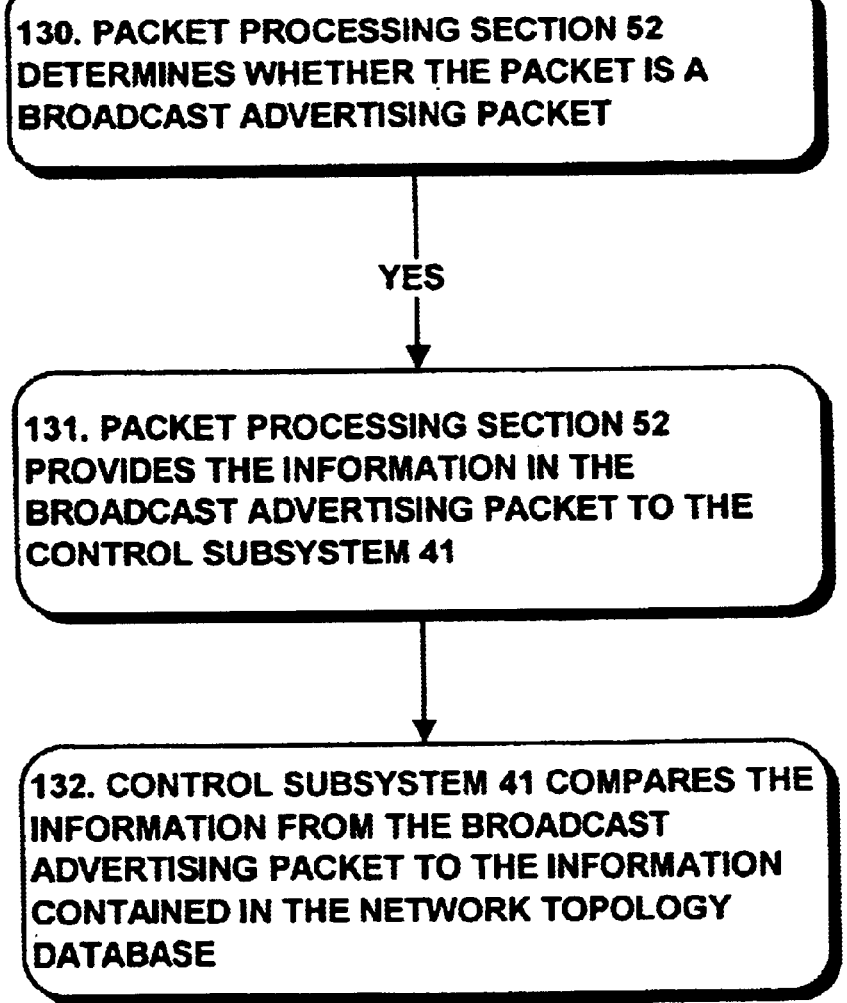
Figure 5H:
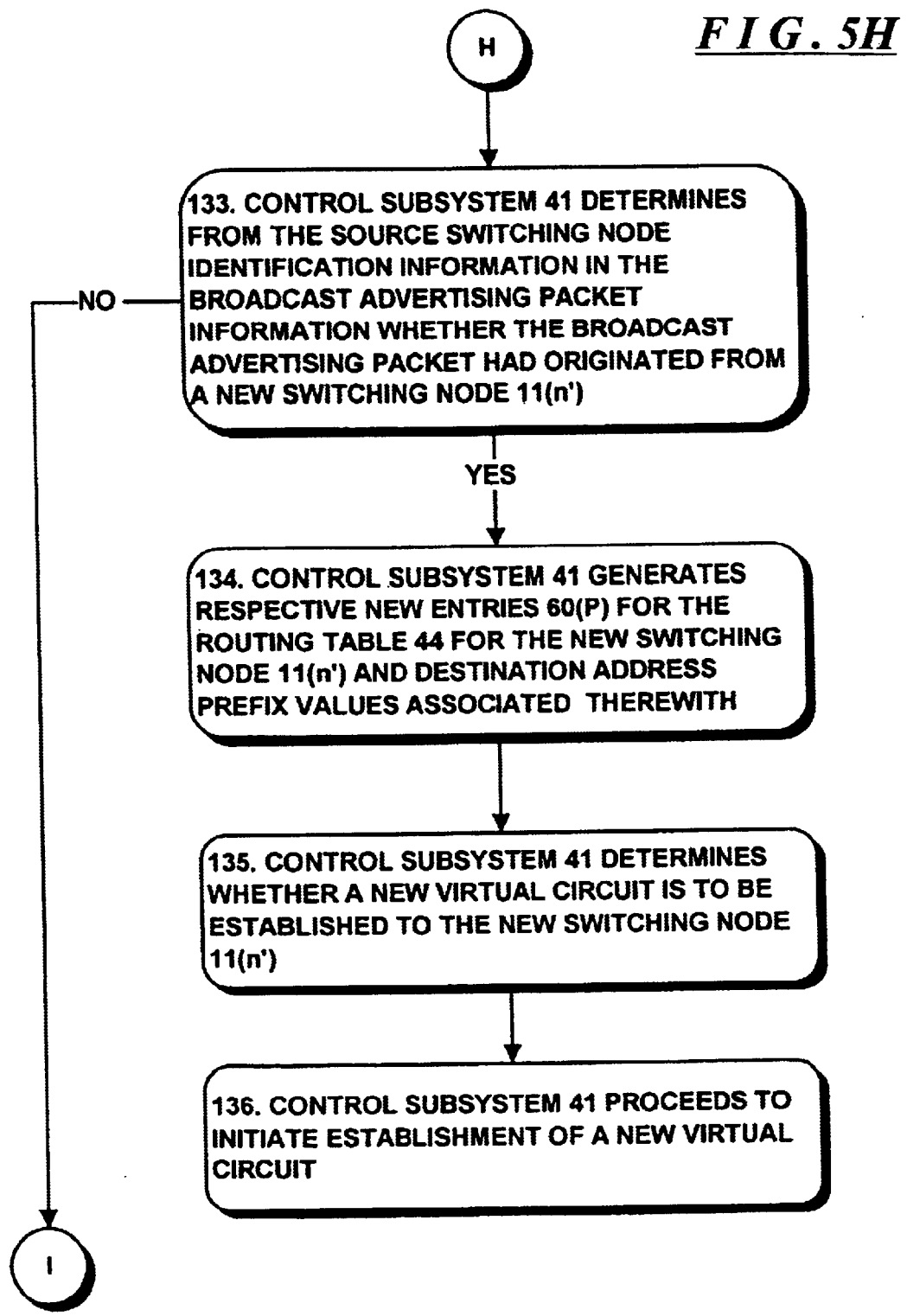
Figure 5I:
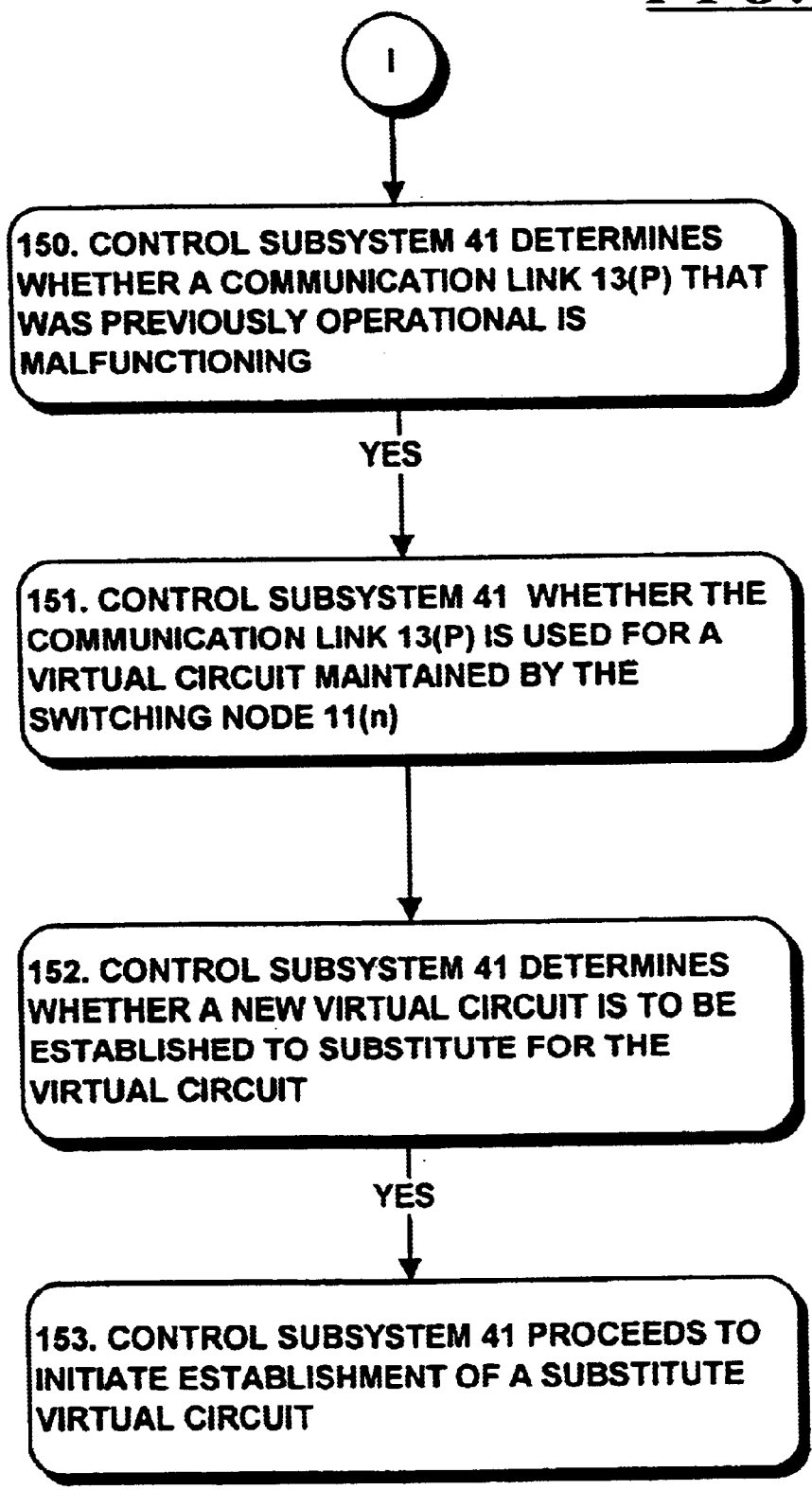

The detailed operations performed by a switching node 11(n) in connection with the invention will be described in connection with the flow chart in FIG. 5. With reference to FIG. 5, the switching node 11(n) will normally be controlled in response to reception of respective packets, and the specific operations that are performed generally depend on the type of packet received by the packet processing and switching subsystem 40, in particular, whether the packet is a virtual circuit packet, a device packet, a broadcast advertising packet, or a virtual circuit establishment packet. Initially, the packet processing section 52 will receive a packet from the packet receive interface 50 and determine its packet type (step 100). If the packet processing section 52 determines that the packet is a virtual circuit packet (step 101), it will provide the virtual circuit identifier from the field 32 (FIG. 3) of the virtual circuit packet to the control subsystem 41 (step 102). The control subsystem 41, in turn, will identify the particular entry 70(c) of the virtual circuit table 45 associated with the virtual circuit identifier provided by the packet processing section 52 (step 103) and determine whether the switching node 11(n) is the terminating switching node for the virtual circuit (step 104). If the control subsystem 41 determines that the switching node 11(n) is not the terminating switching node for the virtual circuit, it will obtain the output communication link identifier from field 74 of the entry 70(c) associated with the virtual circuit in the virtual circuit table 45 (step 105) and provide the output communication link identifier to the packet processing section 52 (step 106). The packet processing section 52, in turn, will use the output communication link identifier that it obtains from the control subsystem 41 to control the packet switching section 53, to, in turn, enable the virtual circuit packet to be transmitted over the output communication link 43 identified by the output communication link identifier (step 107).

Returning to step 104, if the control subsystem 41 determines in that step that the switching node 11(n) is the terminating switching node for the virtual circuit identified by the virtual circuit identifier in field 32 of the virtual circuit packet 30, it will enable the packet processing section 52 to extract the device packet 20 from the virtual circuit packet (step 110) and provide it with the address for the destination computer system 12($m_D$) from field 23 (FIG. 2) of the device packet 20 (step 111). Using the destination address, the control subsystem 41 can identify the particular output communication links 43 thereto from the communication link identifier field 63 (step 112) and provide the output communication link identifier to the packet processing section 52 (step 113). The packet processing section 52, in turn, will use the output communication link identifier that it obtains from the control subsystem 41 to control the packet switching section 53, to, in turn, enable the virtual circuit packet to be transmitted to the destination computer system 12($m_D$) over the output communication link 43 identified by the output communication link identifier (step 114).

Returning to step 101, if the packet processing section 52 determines in that step that the packet received from the packet receive interface 50 is not a virtual circuit packet 30, it will sequence to step 120 to determine whether the packet is a device packet 20 (FIG. 2). If the packet processing section 52 makes a positive determination in that step, a series of steps will be performed to generate a virtual circuit packet 30, embed the received device packet 20 in the virtual circuit packet 30 and transmit the virtual circuit packet 30 over the one of the output communication links 43 associated with the virtual circuit. In those operations, the packet processing section 52 will initially provide the control subsystem 41 with the address for the destination computer system 12($m_D$) to Which the device packet 20 is to be transferred from field 23 of the device packet (step 121). The control subsystem 41, in turn, will use the prefix portion of the destination address to identify one of the entries 65(p) of the prefix/virtual circuit table 46, and obtain the virtual circuit identifier from field 68(p) of the identified entry, thereby to identify the virtual circuit to be used for the device packet (step 122). In addition, control subsystem 41 will obtain, from the entry 70(c) of the virtual circuit table 45 that is associated with virtual circuit identifier obtained in step 122, the one of the output communication links 43 that is associated with the virtual circuit (step 123). Thereafter, the control subsystem 41 will provide both the virtual circuit identifier and the output communication link identifier to the packet processing section 52 (step 124).

When the packet processing section 52 receives the virtual circuit identifier and output communication link identifier from the control subsystem 41, it, will generate the virtual circuit packet 30, embed the device packet 20 in the generated virtual circuit packet 30, and load the virtual circuit identifier in field 32 of the generated device packet 30 (step 125). After the virtual circuit packet 30 is generated, the packet processing section will use the output communication link identifier that it obtains from the control subsystem 41 to control the packet switching section 53, to, in turn, enable the virtual circuit packet to be transmitted over the output communication link 43 identified by the output communication link identifier (step 126).

Returning to step 120, if the packet processing section 52 determines in that step that the packet received from the packet receive interface 50 is not a device packet 20, it will sequence to step 130 to determine whether the packet is a broadcast advertising packet. If the packet processing section makes a positive determination in step 130, it will provide the information in the broadcast advertising packet to the control subsystem 41 (step 131). As indicated above, the broadcast advertising packet includes information such as the identification of the particular switching node 11(n') (n'≠n) that originated the broadcast advertising packet, the identification and status of each of the communication links 13(p) extending therefrom. Accordingly, when the control subsystem 41 receives the broadcast advertising packet information from the packet processing section 52, it will compare the information to the contents of its network topology database (step 132) to determine if the broadcast advertising packet indicates a change in the network topology. If a the broadcast advertising message indicates that a change has occurred to the network, the control subsystem 41 may take predetermined actions. Of particular interest to the invention described herein, if, for example, the broadcast advertising message indicates that a switching node 11(n') (n'≠n), not previously in the network topology database of the switching node 11(n), has been added, the control subsystem 41 will determine whether a virtual circuit is to be established to the switching node 11(n'). In addition, if the broadcast advertising message indicates that a communication link is malfunctioned that is associated with a virtual circuit for which the switching node 11(n) is the originating switching node 11(nO), the switching node 11(n) can operate to establish another virtual circuit which does not make use of the malfunctioning communication link. Furthermore, the control subsystem 41 can, for example, determine from a broadcast advertising message whether a switching node 11($n'$) ($n'\neq n$) has been assigned a new prefix, in which case it can update the routing table 44 and prefix/virtual circuit table 46 accordingly.

Accordingly, after the control subsystem 41 will determine from the source switching node identification information in the broadcast advertising packet information whether the broadcast advertising packet had been originated from a new switching node 11($n'$) ($n'\neq n$) (step 133). If the control subsystem 41 makes a positive determination in step 133, it will generate new entries 60($r$) for the routing table 44 associated with the new switching node 11($n'$) (step 134). In that operation, the control subsystem 41 will generate an entry 60($r$) for each prefix associated with the new switching node 11($n'$) and it may also generate an entry 60($r$) that is associated with the node identifier for the new switching node 11($n'$). The control subsystem 41 will determine whether a new virtual circuit is to be established to the new switching node 11($n'$) (step 135) and if so will proceed to initiating establishment of a virtual circuit (step 136), in the process generating an entry 65($p$) in the prefix/virtual circuit table 46 for each prefix that associated with the new switching node 11($n'$) and an entry 70($c$) in the virtual circuit table 45 that is associated with the virtual circuit.

On the other hand, if the control subsystem 41 makes a negative determination in step 133, it will proceed to step 150. In that step, the control subsystem 41 will determine whether the broadcast advertising packet information indicates that a communication link 13($p$) that was previously operational is malfunctioning (step 150). If the control subsystem 41 makes a positive determination in step. 150, it will determine whether the communication link 13($p$) is used for a virtual circuit maintained by the switching node 11($n$) (step 151), and if so determine whether a new virtual circuit is to be established to substitute for the virtual circuit (step 152). If the control subsystem 41 makes a positive determination in step 153, it can proceed to establish a substitute virtual circuit (step 153), in the process generating an entry 70($c$) for the virtual circuit table 45. As indicated above, the switching node 11($n$) will proceed to re-establish a virtual circuit if it was the originating switching node 11($n_O$) for the non-operational virtual circuit.

The invention provides a number of advantages. In particular, as indicated above, it provides a number of advantages normally associated with networks constructed to transfer packets according to the virtual circuit packet transfer methodology to devices, represented by the computer system 12($m$) depicted in FIG. 1, which transmit and receive packets according to the connectionless packet transfer methodology. The network enables packets to be transferred by the respective switching nodes 11($n$) along the respective virtual circuit from the originating switching node 11($n_O$) to the terminating switching node 11($n_T$) without requiring each of the switching nodes along the virtual circuit to make a routing calculation for each such packet. In addition, the invention can provide enhanced packet transfer service over the service provided by network constructed to transfer packets according to the virtual circuit packet transfer methodology, since the switching nodes 11($n$) will maintain the virtual circuits, the delay in transferring information due to the overhead required in establishing virtual circuits will be reduced.

It will be appreciated that a number of modifications may be made to the network 10 as described above in connection with FIGS. 1 through 5. For example, although the invention is described in connection with SMDS packets as device packets provided by respective source computer systems 12($m_S$) for transfer to respective destination computer systems 12($m_D$), it will be appreciated that the invention can be used in connection with transfer of device packets having a variety of organizational structures.

In addition, the invention can be used in connection with a network which have some switching nodes which operate in accordance with the connectionless methodology and other switching nodes operate in accordance with the virtual circuit methodology. For example, with reference to FIG. 1, since switching node 11(3) is not connected to receive device packets from, or transfer device packets to, any of the computer systems 12($m$), it may operates solely in accordance with the virtual circuit methodology.

Similarly, although the invention has been described in connection with device packets 20 and virtual circuit packets having respective structures and organizations described above in connection with FIGS. 2 and 3, it will be appreciated that a variety of structures and organizations may be used in connection with the respective types of packets.

Furthermore, although the invention has been described in connection with use of a routing table 44 and a virtual circuit table 45 having respective structures and organizations as depicted in FIG. 4, it will be appreciated that databases may be used having a variety of structures and organizations instead of and/or in addition to the databases 44 and 45, for providing the types of information as described above.

It will be appreciated that a system in accordance with the invention can be constructed in whole or in part from special purpose hardware or a general purpose computer system, or any combination thereof, any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An apparatus for transferring packets over a network from an originating switching node to a destination switching node, the network including a plurality of interconnected switching nodes, the apparatus comprising:

a source device for providing a device packet, the device packet including a header portion and a data portion, the header portion including a source device address corresponding to the source device and a destination device address corresponding to a destination device, the data portion including data to be transferred, wherein the destination device is the desired destination of the data;

an originating switching node coupled to the source device and to at least one of the plurality of switching nodes, the originating switching node for receiving the device packet and responsively providing a virtual circuit packet, the virtual circuit packet including a virtual circuit header and the device packet, the originating switching node including a controller and a virtual circuit table, the virtual circuit table including a plurality of virtual circuit identifiers each corresponding to a virtual circuit table entry, each virtual circuit table entry defining a virtual circuit path including at least one of the plurality of interconnected switching nodes where the virtual circuit path begins from the originating switching node and ends at a destination switching node, the controller coupled to the virtual circuit table, the controller selecting the virtual circuit identifier as a function of the destination address of the device packet, the selected virtual circuit identification corresponding to the virtual circuit table entry defining the virtual circuit pathway between the originating switching node and the destination switching node, the originating switching node transmitting the virtual circuit packet to the subsequent one, the plurality of interconnected switching nodes identified in said virtual circuit table entry;

each of the identified switching nodes including a plurality of virtual circuit information, each of the identified switching nodes receiving the virtual circuit packet and the virtual circuit identifier contained therein, each of the plurality of interconnected switching nodes being responsive to the received virtual circuit identifier, and transmit the virtual circuit packet to the subsequent one of the plurality of interconnected switching nodes in the defined virtual circuit pathway corresponding to the received virtual circuit identifier;

a destination switching node coupled to at least one of the plurality of switching nodes and to the destination device, the destination switching node receiving the virtual circuit packet, and responsively removes the device packet from the virtual circuit packet and transfers the device packet to the destination device.

2. A network as defined in claim 1 in which at least said originating switching node comprises:

A. a packet processing and switching fabric for receiving at least device packets from said source device and transmitting virtual circuit packets to at least one other switching node in the network; and B. a control module responsive to the receipt by the packet processing and switching fabric of a device packet for generating a virtual circuit packet therefore, the control module providing said virtual circuit packet to said packet processing and switching fabric for transmission to another of said switching nodes.

3. A network as defined in claim 2 in which (i) each switching node is identified by a switching node identifier, (ii) each device packet includes a destination address portion identifying the one of said switching nodes which is to be the destination switching node for the device packet, and (iii) each virtual circuit originating at said originating switching node is identified by a switching node identifier, the originating switching node further maintaining a switching node identifier/virtual circuit table that associates each switching node which operates as a destination switching node with a virtual circuit identifier, the originating switching node, when generating the virtual circuit packet for said device packet, using the destination address portion of the device to identify the virtual circuit identifier for the virtual circuit over which the virtual circuit packet is to be transmitted.

4. A network as defined in claim 1 in which said terminating switching node on receipt of a virtual circuit packet, regenerates the device packet therefrom and provides the device packet to the destination device.

5. A network as defined in claim 4 in which said device packet includes an address portion identifying the destination device, the terminating switching node using the address portion to identify the destination device to which the device packet is to be provided.

6. A network as defined in claim 4 in which the terminating switching node comprises:

A. a packet processing and switching fabric for receiving at least virtual circuit packets from at least one other switching node in the network, and transmitting device packets to at least one destination device; and B. a control module responsive to the receipt by the packet processing and switching fabric of a virtual circuit packet for generating a device packet therefore, the control module providing said device packet to said packet processing and switching fabric for transmission to said at least one destination device.

7. A switching node configured to be connected to a source device, the switching node being further configured to be connected in a network including a plurality of other switching nodes, the source device generating device packets for transfer to a destination device, each device packet including an address potion including a destination address identifying said destination device and a switching node connected thereto, said switching node being configured to pre-establish a virtual circuit with the switching node connected to the destination device for transferring virtual circuit packets from the switching node as an originating switching node, to one of said switching nodes connected to said destination device, as a terminating switching node, said originating switching node comprising:

A. a device packet receiver for receiving each said device packet from said source device; said device packet comprising a header having said destination address and a source address, and a data portion;

B. a virtual circuit packet generator for generating a virtual circuit packet for said device packet, said virtual circuit packet including a virtual circuit packet header prepended to said device packet, said virtual circuit packet header comprising a virtual circuit identifier identifying said virtual circuit over which the virtual circuit packet is to be transferred, the virtual circuit identifier being determined based on at least a portion of the destination device address in the respective device packet, that identifies the terminating switching node; and C. a virtual circuit packet transmitter for transmitting the virtual circuit packet over the virtual circuit; and wherein (i) each switching node is identified by a switching node identifier, (ii) each device packet includes a destination address portion identifying the one of said switching nodes which is to be the destination switching node for the device packet, and (iii) each virtual circuit originating at said originating switching node is identified by a switching node identifier, the originating switching node further maintaining a switching node identifier/virtual circuit table that associates each switching node which operates as a destination switching node with a virtual circuit identifier, the originating switching node, when generating the virtual circuit packet for said device packet, using the destination address portion of the device to identify the virtual circuit identifier for the virtual circuit over which the virtual circuit packet is to be transmitted.

8. An originating switching node as defined in claim 7, in which each virtual circuit packet includes a virtual circuit identifier portion, said originating switching node using the virtual circuit identifier from the switching node identifier/virtual circuit table associated with the one of the switching nodes to operate as a destination switching node for said device in the virtual circuit identifier portion.

9. An originating switching node as defined in claim 7, the originating switching node further includes a virtual circuit table identifying, for each virtual circuit whose path includes the originating switching node, one of said other switching nodes in the network which is a next switching node along the virtual circuit's path, the control module enabling the packet processing and switching fabric to transmit the virtual circuit packet generating thereby to the one of said other switching nodes in the network as identified by the virtual circuit table.

10. A switching node configured to be connected to a destination device, the switching node being further configured to be connected in a network including a plurality of other switching nodes, at least one of said other switching nodes being connected to a source device for generating device packets for transfer to said destination device, each device packet including an address portion including a destination address identifying said destination device, said switching node being configured to pre-establish a virtual circuit with the switching node connected to the source device for transferring virtual circuit packets from the switching node connected to said source device, as an originating switching node to the switching node, as a terminating switching node, said terminating switching node comprising:

A. a virtual circuit packet receiver for receiving each said virtual circuit packet from said at least one other switching node said virtual circuit packet comprising a device packet having a header including a virtual circuit identifier for identifying a virtual circuit over which the virtual circuit packet is to be transferred, the virtual circuit identifier being determined based on at least a portion of the destination address in the device packet;

B. a device packet extractor for extracting a device packet from said virtual circuit packet; and C. a device packet transmitter for transmitting the device packet to the destination device identified by the destination address in the device packet; and wherein (i) each switching node is identified by a switching node identifier, (ii) each device packet includes a destination address portion identifying the one of said switching nodes which is to be the destination switching node for the device packet, and (iii) each virtual circuit originating at said originating switching node is identified by a switching node identifier, the originating switching node further maintaining a switching node identifier/virtual circuit table that associates each switching node which operates as a destination switching node with a virtual circuit identifier, the originating switching node, when generating the virtual circuit packet for said device packet, using the destination address portion of the device to identify the virtual circuit identifier for the virtual circuit over which the virtual circuit packet is to be transmitted.

11. A terminating switching node as defined in claim 10 in which said device packet includes an address portion identifying the destination device, the device packet transmitter using the address portion to identify the destination device to which the device packet is to be provided.

* * * * *